July 15, 1941.   E. BORCHARDT ET AL   2,249,598
PROCESS FOR COATING OXIDE CATHODES
Filed Oct. 19, 1939
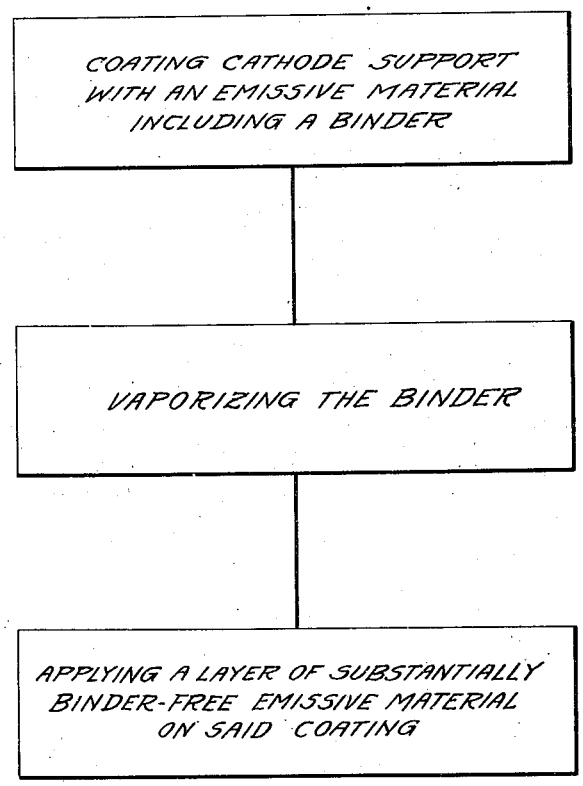
INVENTORS
E. BORCHARDT
H. PIETSCH
BY
ATTORNEY Patented July 15, 1941

2,249,598

UNITED STATES PATENT OFFICE 2,249,598

PROCESS FOR COATING OXIDE CATHODES

Erwin Borchardt, Berlin, and Herbert Pietsch, Berlin-Siemensstadt, Germany, assignors to "Fides Gesellschaft für die Verwaltung und Verwertung von gewerblichen Schutzrechten m. b. H.", Berlin, Germany, a corporation of Germany Application October 19, 1939, Serial No. 300,170
In Germany October 31, 1938

1 Claim. (Cl. 250—27.5)

Our invention relates to cathodes and especially oxide coated cathodes.

An object of the invention is to securely bind an emissive cathode material to its support without cracks in the coating.

Other objects of the invention will be apparent from the following description.

The drawing states the steps to be taken in accordance with the invention.

In the preparation of oxide cathodes by applying oxides or carbonates on a directly or indirectly heated support material, it is customary to mix a binding agent with the suspension of emission material. As binding agent, solutions of nitrocellulose, such as collodion, or rosin, such as colophony, camphor or the like, may be considered. In utilizing the suspension of emission material, one cannot mix as much binding agent as might be desired, in order to obtain an unobjectionable wetting of the support material, because usually slight fissures result in the emission coating prepared by depositing several layers. The invention shows a way by which it is possible to avoid this difficulty.

According to the invention first a binder-rich layer is placed on the support material, for example a directly or indirectly heated nickel or tungsten wire and the layer secured by vaporizing part or all of the binder. Then additional, essentially binder-free layers are applied. By this means, the first layer wets the support material well on account of its high binder content. It has been shown that the remaining layers of emission material adhere satisfactorily to binder-rich layers, even if they are prepared by applying a binder-free or binder-poor suspension. These layers, because of their low binder content, are not inclined to form fissures.

It is not necessary that the first layer contain emission material. One can rather first coat the support material with a solution of a material vaporizing or decomposing on heating without leaving residue. For example, a nitrocellulose solution, such as collodion or rosin solutions, for example a solution of colophony and alcohol, are suitable for this purpose. Camphor solutions are also applicable. These solutions are applied in the known manner by dipping or spraying on the support material. After the solution agent is entirely or partially vaporized, the emission material is applied in known manner by depositing a suitable suspension. Finally by heating the cathode, any residue of the binding agent contained in the first layer and if necessary in smaller amount also in the remaining layers is driven off. This can be done preferably in vacuum, but may be done in an oxygen-containing atmosphere, such as air. The oxides of alkaline earth metals or other compounds of these metals which can be transformed into oxides on heating, such as carbonates, can be used. The emissive alkaline earth metals utilized are barium, strontium or calcium, or any combination of them.

Instead of using an emission-free solution of a suitable material for the preparation of the first layer, a binder-rich suspension of alkaline earth oxides or carbonates may be used. After vaporizing the suspension or solution agent, in the already described manner, the additional layers are applied and by using known method of action, the cathode is converted into operating condition.

Although we have described a specific embodiment of the invention, we do not desire to be limited thereto as various modifications may be made in the details thereof, without departing from the spirit and scope of the appended claim.

We claim:

The process of applying an oxide coating on a cathode support which comprises coating the support with an emissive material including a binder, vaporizing the binder and then applying a layer of substantially binder-free emissive material on said coating.

ERWIN BORCHARDT.
HERBERT PIETSCH.